United States Patent
Nonoyama et al.

(10) Patent No.: US 6,559,193 B2
(45) Date of Patent: May 6, 2003

(54) ACRYLIC SOL FOR A SOUND INSULATING UNDERBODY COATING

(75) Inventors: Akira Nonoyama, Chiryu (JP); Hiroshi Torii, Hekinan (JP); Kazunori Ito, Toyota (JP); Yutaka Ohashi, Nisshin (JP); Ayumi Takata, Toyota (JP)

(73) Assignees: Aisin Kako Kabushiki Kaisha, Nishikamo-gun (JP); Toyota Jidosha Kabushiki Kaisha, Toyota (JP)

( * ) Notice: Subject to any disclaimer, the term of this patent is extended or adjusted under 35 U.S.C. 154(b) by 80 days.

(21) Appl. No.: 09/846,245

(22) Filed: May 2, 2001

(65) Prior Publication Data

US 2002/0002211 A1 Jan. 3, 2002

(30) Foreign Application Priority Data

May 23, 2000 (JP) ........................................ 2000-151368

(51) Int. Cl.⁷ .............................. C08J 9/00; C08G 18/34
(52) U.S. Cl. ............................ 521/95; 521/75; 521/128; 521/137
(58) Field of Search .......................... 521/75, 137, 95, 521/128

(56) References Cited

U.S. PATENT DOCUMENTS 5,284,918 A * 2/1994 Huyah-Tran et al.
5,741,824 A   4/1998 Butschbacher et al.
5,756,555 A * 5/1998 Wesch et al.

FOREIGN PATENT DOCUMENTS

| | | |
|---|---|---|
| DE | 40 34 725 | 5/1992 |
| DE | 43 42 098 | 6/1995 |
| EP | 0 153 135 | 8/1985 |
| JP | 53-36105 | 9/1978 |
| JP | 63-66861 | 12/1988 |
| JP | 6-145454 | 5/1994 |
| JP | 6-171001 | 6/1994 |
| JP | 6-145454 | 3/1995 |
| JP | 7-233299 | 9/1995 |
| JP | 10-77379 | 3/1998 |
| JP | 11-217479 | 8/1999 |
| WO | WO 92/19662 | 11/1992 |

* cited by examiner

Primary Examiner—Morton Foelak
(74) Attorney, Agent, or Firm—Oblon, Spivak, McClelland, Maier & Neustadt, P.C.

(57) ABSTRACT

Disclosed is an acrylic sol for a sound insulating underbody coating. It includes acrylic polymer fine particles, a plasticizer, a filler, a plasticizer, a blocking type urethane resin, a curing agent and a foaming agent. Since it includes the acrylic polymer particles as a major constituent unit, it does not generate a hydrogen chloride gas and dioxins when it is burned. Moreover, since the paint film resulting from the acrylic sol has a net-shaped structure by the cross-linkage reactions of the urethane resin, and since the bulkiness of the paint film is increased by the foaming agent, it has a good cold resistance and adhesion property toward automotive steel plates, and effects a superb chipping resistance and sound insulating performance.

40 Claims, No Drawings

ACRYLIC SOL FOR A SOUND INSULATING UNDERBODY COATING

BACKGROUND OF THE INVENTION

Field of the Invention

The present invention relates to an acrylic sol for a sound insulating underbody coating. More particularly, it relates mainly to an acrylic sol which gives automotive steel plates, etc., a chipping resistance, a sound insulating performance, and so on, when it is coated on the exterior bottom surface of the underbody, wheel houses, and the like, of automobiles.

In the bottom surface of the underbody, wheel houses, etc., of automobiles, there occurs a so-called chipping phenomenon in which a paint film is come off by colliding with small stones and gravels being flied up by tires while automobiles are driving. Moreover, there arise colliding sounds, so-called splash noise, resulting from the collisions of the small stones and gravels. Accordingly, in order to inhibit the chipping phenomenon and to reduce the splash noise, a sound insulating underbody coating, which employs a polyvinyl chloride-based plastisol, has been coated and dried conventionally on a surface of an automotive steel plate, which has gone through a coating process, so that a paint film for protecting an automotive body is formed.

While, in view of protecting the environment of the earth, it is expected to recycle the materials which are used in automotive bodies. It is desired that they are used as a thermal energy by burning them, not by the current practice, for example, by burying them as shredded dusts in the land.

However, the aforementioned vinyl chloride plastisol generates the hydrogen chloride gas, which becomes a source of substances causing the destruction of the ozone layer. Further, the resulting hydrogen chloride causes the acid rain. Furthermore, the polyvinyl chloride-based plastisol has a problem in that they generate dioxins when they are burned. Consequently, a plastisol for a sound insulating underbody coating, plastisol which can replace the polyvinyl chloride-based plastisol, has been longed for.

As a plastisol, which substitutes for the polyvinyl chloride-based plastisol, Japanese Unexamined Publication (KOKAI) No. 6-145,454 discloses an acrylic ester-based copolymer plastisol, which includes particles and a plasticizer. The particles are composed of ion cross-linked substances, in which carboxyl groups of a copolymer are cross-linked by adding monovalent or divalent metallic cations. The copolymer includes the following units as main constituent units in specific rates. For instance, the copolymer includes alkyl methacrylate ester units, in which a number of the carbon atoms in the alkyl groups falls in a specific range, diene-based monomer units, and a radically polymerizable unsaturated carboxylic acid, which has a carboxyl group and has a specific number of the carbon atoms.

Further, Japanese Unexamined Patent Publication (KOKAI) No. 7-233,299 discloses an acrylic plastisol, which includes acrylic polymer fine particles. The acrylic polymer fine particles are composed of a core portion and a shell portion, and accordingly have a multi-layered structure of two layers at least.

Furthermore, Japanese Examined Patent Publication (KOKOKU) No. 63-66,861 discloses a plastisol, which does not contain the polyvinyl chloride. For example, the plastisol is composed of a methyl methacrylate polymer or copolymer, a plasticizer, a filler, a blocked polyisocyanate, and a polyamine.

Although the plastisols, which are disclosed in Japanese Unexamined Patent Publication (KOKAI) No. 6-145,454 and Japanese Unexamined Patent Publication (KOKAI) No. 7-233,299, are free from the drawbacks associated with the aforementioned polyvinyl chloride-based plastisol, they are not sufficient in terms of the adhesion property of the resulting paint film to a substrate and the cold resistance. In addition, it is not possible to obtain the advantageous effects in terms of the requisite performances for the sound insulating underbody coating, such as the inhibition of the chipping phenomenon and the reduction of the splash noise, with these plastisols as described above.

In addition, the plastisol disclosed in Japanese Examined Patent Publication (KOKOKU) No. 63-66,861 is likewise free from the drawbacks associated with the polyvinyl chloride-based plastisol. However, it is not possible to say that the plastisol can be satisfactory in terms of the requisite performances for the sound insulating underbody coating, such as the inhibition of the chipping phenomenon and the reduction of the splash noise. Therefore, it is not possible to employ these plastisols as a plastisol for a sound insulating underbody coating, plastisol which can substitute for the polyvinyl chloride-based plastisol.

SUMMARY OF THE INVENTION

The present invention has been developed in view of the above-described circumstances. It is an object of the present invention to provide an acrylic sol for a sound insulating underbody coating, acrylic sol which effects a favorable chipping resistance and a sufficient sound insulating performance without generating the hydrogen chloride gas and the dioxins when it is burned.

An acrylic sol for a sound insulating underbody coating according to the present invention, which is adapted to achieve the aforementioned object, is characterized in that it comprises: acrylic polymer fine particles; a plasticizer; a filler; a blocking type urethane resin; a curing agent; and a foaming agent.

As the present acrylic sol includes the acrylic polymer fine particles as a major constituent member, it is possible to obtain an acrylic sol for a sound insulating underbody coating, which is free from the aforementioned drawbacks associated with the sound insulating underbody coating whose major constituent member is the conventional vinyl chloride plastisol. Namely, the present acrylic sol does not generate the hydrogen chloride gas as well as the dioxins when it is burned. Further, when the acrylic polymer fine particles are a core-shell structure, the present acrylic sol makes a sol for a sound insulating underbody coating, in which the storage stability of the thus prepared acrylic sol is further improved, which is further inhibited from the increment of the viscosity during the coating, and which is further prohibited from the generation of the bleeding after the curing by heating.

Furthermore, as the present acrylic sol includes the blocking type urethane resin and its curing agent, the cross-linkage reactions take place by the intermolecular cross-liking of the urethane resin when the thus prepared acrylic sol is coated and is heated thereafter. Since the urethane resin takes the net-shaped structure by the cross-linkage reactions, it is possible to obtain an acrylic sol for a sound insulating underbody coating, acrylic sol which makes a paint film of favorable cold resistance, of favorable adhesion property to automotive steel plates and of superb chipping resistance. Note that, when a weight ratio of the acrylic polymer fine particles with respect to the blocking type urethane resin falls in a range of from 90/10 to 15/85, the present acrylic sol makes an acrylic sol for a sound insulating underbody coating, acrylic sol which can result in a paint film, whose cold resistance, adhesion property to automotive steel plates and chipping resistance are furthermore improved, and which can bring about a favorable coating operability.

Furthermore, when the blocking type urethane resin is blocked by at least one member selected from the group consisting of oxime blocking agents and amine blocking agents, the blocking agents dissociate at a relatively low temperature so that the reactions with the curing agent can be developed. Accordingly, the present acrylic sol can make an acrylic sol for a sound insulating underbody coating, acrylic sol which can be gelled at a much lower temperature so as to form a paint film.

Moreover, when the curing agent is a solid hydrazine-compound curing agent, it reacts with the urethane resin at a relatively low temperature. Consequently, the present acrylic sol can make an acrylic sol for a sound insulating underbody coating, acrylic sol which can be gelled at a much lower temperature so as to form a paint film and whose storage stability is much more favorable.

In addition, as the present acrylic sol includes the foaming agent, it produces gases when it is heated. The gases form cells inside the resulting paint film and increases the bulkiness thereof. Accordingly, the colliding sounds (i.e., the so-called splash noise), resulting from the collisions of small stones and gravels, are absorbed by the paint film. Thus, it is possible to obtain an acrylic sol for a sound insulating underbody coating which is of high sound insulating performance.

As having described so far, the present acrylic sol for a sound insulating underbody coating does not generate the hydrogen chloride gas as well as the dioxins when it is burned. Moreover, it can exhibit a favorable cold resistance and adhesion property to automotive steel plates, and can effect a superb chipping resistance and sound insulating performance.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

The present acrylic sol for a sound insulating underbody coating comprises the acrylic polymer fine particles, the plasticizer, the filler, the blocking type urethane resin, the curing agent, and the foaming agent. Hereinafter, there are described in detail on the present acrylic sol for a sound insulating underbody coating, on how to prepare it, and on how to coat it.

As for the aforementioned acrylic polymer fine particles, constituting the present acrylic sol, it is possible to employ polymers, which are usually used as compositions of acrylic sols. For instance, it is possible to employ a simple polymer or a copolymer, which is made from a monomer selected from the group consisting of alkyl acrylate ester, alkyl methacrylate ester, etc. Specifically, as these monomers, it is possible to list methyl acrylate, ethyl acrylate, n-butyl acrylate, isobutyl acrylate, methyl methacrylate, ethyl methacrylate, n-butyl methacrylate, isobutyl methacrylate, and so on.

It is preferred that the acrylic polymer fine particles can be a core-shell structure fine particles, which are constituted by a core portion and a shell portion. When the present acrylic sol is prepared by using the core-shell structure acrylic polymer fine particles, the following advantages are effected. For example, the storage stability of the resulting acrylic sol can be further improved, the viscosity can be further inhibited from increasing when the resulting acrylic sol is coated as a sound insulating underbody coating, and the bleeding can be further prohibited from generating when the resulting acrylic sol is cured by heating.

Further, when the acrylic polymer fine particles are the core-shell structure fine particles, it is preferred that the core portion can be constituted by a plasticizer-affinitive polymer and the shell portion can be constituted by a plasticizer-non-affinitive polymer. Since the polymer of the shell portion, which exhibits a poor compatibility to the plasticizer, covers the polymer of the core portion, which exhibits a compatibility thereto, the increment of the viscosity is suppressed when the present acrylic polymer is put in storage. Accordingly, it is possible to further improve the storage stability. Furthermore, since the polymer of the shell portion comes to exhibit a compatibility to the plasticizer when it is heated to an appropriate temperature, the bleeding hardly occurs after the present acrylic resin is cured by heating.

It is preferred that the component of the core portion can be a polymer, which is made from at least one methacrylate selected from the group consisting of n-butyl methacrylate, iso-butyl methacrylate, ethyl methacrylate, etc., or a copolymer thereof, and that the polymer or the copolymer can be contained in the core portion in an amount of 50% by weight or more. By thus making the core component highly compatible to the plasticizer, it is possible to inhibit the bleeding from taking place after the present acrylic sol is cured by heating. Particularly, in view of giving a flexibility to the resulting paint film, it is preferred that the component of the core portion can be mainly composed of a copolymer of butyl methacrylate and isobutyl methacrylate.

While, it is preferred that the component of the shell portion can be a polymer, which is made from at least one member selected from the group consisting of methyl methacrylate, benzyl methacrylate, styrene, etc., or a copolymer thereof, and that the polymer or the copolymer can be contained in the shell portion in an amount of 50% by weight or more. By thus making the shell component much lesser compatible to the plasticizer, it is possible to inhibit the viscosity of the present acrylic sol from increasing during storage. Thus, the storage stability can be further improved. Particularly, in view of furthermore improving the storage stability, it is preferred that the component of the shell portion can be mainly composed of methyl methacrylate.

Furthermore, regarding a ratio of the polymers in the core portion and the shell portion, it is preferred that a ratio of the core portion polymer with respect to the shell portion polymer can fall in a range of from 25/75 to 70/30 by weight. When the ratio of the core component with respect to the shell component is less than 25/75 by weight, compared with the case where the ratio falls in the aforementioned desired range, it is likely to heighten the possibility of generating the bleeding after curing by heating. When the ratio of the core component with respect to the shell component is more than 70/30 by weight, compared with the case where the ratio falls in the aforementioned desired range, the shell component might cover the core portion insufficiently so that the storage stability might be adversely affected.

In view of the chipping resistance and the storage stability, a weight average molecular weight of the acrylic polymer fine particles can preferably fall in a range of from a hundred thousand to a few millions, preferably in a range of from 10,000 to 2,000,000. In view of the diffusibility into the plasticizer and the storage stability, it is preferable to employ the acrylic polymer fine particles whose average particle diameter falls in a range of from 0.1 to 50 μm, preferably in a range of from 0.1 to 10 μm.

As for the aforementioned plasticizer constituting the present acrylic sol, it is possible to employ plasticizers, which have been used conventionally in the polyvinyl chloride-based plastisols. For instance, it is possible to use a phthalic acid-based plasticizer, such as diisononyl phthalate, di-(2-ethylhexyl) phthalate, diisodecyl phthalate, butylbenzyl phthalate, etc., a fatty ester-based plasticizer, such as di-(2-ethylhexyl) adipate, di-n-decyl adipate, di-(2-ethylhexyl) azelate, dibutyl sebacate, di-(2-ethylhexyl) sebacate, etc., a phosphoric ester-based plasticizer, such as tributyl phosphate, tri-(2-ethylhexyl) phosphate, 2-ethylhexyl diphenyl phosphate, an epoxy-based plasticizer, such as an epoxidated soybean oil. In addition, it is possible to employ a polyester-based plasticizer, a benzoic acid-based plasticizer, etc. It is possible to use one of these plasticizers independently or to use two or more of them combinedly. Particularly, in view of being less expensive and being readily available, it is preferable to use diisononyl phthalate. Note that, in view of the chipping resistance, the spraying property, and so forth, the plasticizer can preferably be compounded in the present acrylic sol in a rate of from 50 to 500 parts by weight, further preferably in a rate of from 100 to 400 parts by weight, with respect to 100 parts by weight of the acrylic polymer fine particles.

As for the aforementioned filler constituting the present acrylic sol, it is possible to employ fillers, which have been used ordinarily. For example, it is possible to employ calcium carbonate, mica, talc, kaoline clay, silica, barium sulfate, etc. In addition, it is possible to employ fiber-shaped fillers, such as glass fibers, wallastnite, alumina fibers, ceramic fibers, a variety of whiskers, etc. Particularly, in view of being less expensive, it is preferable to use calcium carbonate. Note that, in view of the chipping resistance, the foaming property, the cost, and the like, the filler can preferably be compounded in the present acrylic sol in a rate of from 50 to 800 parts by weight with respect to 100 parts by weight of the acrylic polymer fine particles.

As for the aforementioned blocking type urethane resin constituting the present acrylic sol, it is possible to employ a urethane resin, which is made by reacting an α-polyol, such as polyether polyol, polyester polyol, etc., with an isocyanate, such as methylene di-p-phenylene diisocyanate (MDI), tolylene diisocyanate (TDI), hexamethylene diisocyanate (HDI), etc., and by blocking the resulting urethane resin with a blocking agent, such as oximes, amines, etc. As such a urethane resin, it is preferable to employ a urethane resin, which is synthesized out of polypropylene glycol (PPG) and tolylene diisocyanate (TDI), because it can be used universally. The blocking agent is an activated hydrogen compound, which is stable at ordinary temperature by being bonded with the isocyanate groups of the urethane resin, and which dissociates upon heating to a predetermined temperature or more. For example, it is possible to use a compound of phenols, lactams, oximes, amines, etc., as the blocking agent.

In general, when a plastisol is coated on the exterior bottom surface of the underbody and wheel houses of automobiles as a sound insulating underbody coating, the plastisol is gelled by utilizing the heating for baking a coat in the subsequent process. In this instance, due to the positional relationship that the exterior bottom surface of the underbody and wheel houses of automobiles are disposed under a heating apparatus, they are less likely to be heated to elevated temperature. Accordingly, they are heated only up to about 140° C. Therefore, it is necessary for the aforementioned blocking agent to dissociate at the temperature of about 140° C. so as to facilitate the reaction of the blocking type urethane resin with the curing agent later described.

The dissociation temperatures of the aforementioned blocking agents differ with each other. Particularly, in view of having such a low dissociation temperature, it is preferable to employ a compound of oximes or amines. For instance, it is possible to list methyl ethyl ketone oxime, 3, 5-dimethyl pyrazole, etc. Especially, in view of dissociating at a much lower temperature, it is preferable to use 3, 5-dimethyl pyrazole.

Note that a compounding amount of the blocking type urethane resin can preferably be adjusted so that it falls in a range of from 90/10 to 15/85 by a weight ratio of the acrylic polymer fine particles with respect to the blocking type urethane resin. When the compounding amount of the blocking type urethane resin is adjusted so that it is less than 10 parts by weight in the weight ratio of the acrylic polymer fine particles with respect to the blocking agent, compared with the case where the ratio falls in the desired range, the resulting acrylic sol exhibits an insufficient chipping performance, cold resistance and adhesion property of the resulting paint film to a substrate. When the compounding amount of the blocking type urethane resin is adjusted so that it is more than 85 parts by weight in the weight ratio of the acrylic polymer fine particles with respect to the blocking agent, compared with the case where the ratio falls in the desired range, a viscosity of a prepared acrylic sol increases so that an operability during the coating operation is adversely affected. Specifically, the blocking type urethane resin can preferably be compounded in the present acrylic sol in a rate of from 10 to 600 parts by weight with respect to 100 parts by weight of the acrylic polymer fine particles.

As for the aforementioned curing agent constituting the present acrylic sol, it is possible to employ a solid aliphatic polyamine, a solid aromatic polyamine, a solid hydrazine compound, or the like. Particularly, in view of curing the present acrylic sol at a relatively low temperature and exhibiting an extremely favorable storage stability, it is preferable to use a solid hydrazine-compound curing agent. As for the solid hydrazine-compound curing agent, it is possible to list hydrazine compounds, such as adipic acid dihydrazide (ADH), sebatic acid dihydrazide (SDH), and so forth.

Since these hydrazine compounds do not have such a high curing temperature, they facilitate the dissociation of the blocking agent, which is bonded with the blocking type urethane resin, and react with the urethane resin, when they are heated to the aforementioned temperature. As a result, the hydrazine compounds form urea links between themselves and the urethane resin. Due to the urea links, it is possible to improve a durability of a paint film, resulting from the present acrylic sol, and an adhesion property between the paint film and a substrate.

Further, under a temperature condition for storing the present acrylic acid, since these solid hydrazine-compound curing agents can be dispersed in the liquid urethane resin, and since they have a high melting point, the storage stability of the present acrylic sol can be improved remarkably, compared with the case where a liquid curing agent is used. Note that, in particular, it is preferable to use adipic acid dihydrazide (ADH) because it is one of the hydrazine compounds, which can be used universally. Furthermore, the curing agent can preferably be compounded in the present acrylic sol in an amount required for curing the urethane resin: namely; the curing agent can preferably be added in the present acrylic sol in such an amount that an equivalent weight of the activated hydrogens in the hydrazine compounds equals to an equivalent weight of the isocyanate groups in the blocking type urethane resin. Specifically, the curing agent can preferably be compounded in the present acrylic sol in a rate of from 0.5 to 500 parts by weight with respect to 100 parts by weight of the blocking type urethane resin.

The aforementioned foaming agent constituting the present acrylic sol is required to further improve the sound insulating performance of the resulting sound insulating underbody coating. It is possible to employ a type of foaming agents, which generate gases upon heating. By the thus generated gases, cells are formed inside the resulting paint film so as to increase the bulkiness of the paint film, and accordingly it is possible to reduce the impulsive sounds, which are generated when small stones, and the like, collide with the paint film. Concretely, it is possible, for example, to list an azo-based foaming agent, such as azodicarbonamide, azobisformamide, etc., a nitroso-based foaming agent, such as dinitroso pentamethylene tetramine, etc., a hydrazine-compound-based foaming agent, such as benzene sulphonyl hydrazide, etc., and so forth. Moreover, it is possible to employ a foaming assistant agent so as to facilitate the generation of the gases by lowering a decomposition temperature of these foaming agents. For instance, it is possible to employ zinc oxide, lead stearate, zinc stearate, sodium-based compounds, potassium-based compounds, urea, etc. Note that the foaming agent can preferably be compounded in the present acrylic sol in a rate of from 0.5 to 30 parts by weight, further preferably in a rate of from 2 to 20 parts by weight, with respect to 100 parts by weight of the acrylic polymer fine particles.

In addition, it is possible to compound the other additives, such as a coloring agent, an antioxidant, a diluent, an ultraviolet absorber, etc., which have been known conventionally, in the present acrylic sol for a sound insulating underbody coating. As for the coloring agent, it is possible, for example, to employ an inorganic pigment, such as titanium dioxide, carbon black, etc., an organic pigment, such as azo-based pigments, phthalocyanine-based pigments, etc., and the like. Note that the coloring agent can preferably be compounded in the present acrylic sol in a rate of from 0.5 to 10 parts by weight with respect to 100 parts by weight of the acrylic polymer fine particles. As for the antioxidant, it is possible, for instance, to employ phenol-based antioxidants, amine-based antioxidants, and so on. Note that the antioxidant can preferably be compounded in the present acrylic sol in a rate of from 0.5 to 10 parts by weight with respect to 100 parts by weight of the acrylic polymer fine particles. As for the diluent, it is possible to employ a solvent, such as xylene, mineral turpentines, etc., and so forth. Note that the diluent can preferably be compounded in the present acrylic sol in a rate of from 10 to 500 parts by weight, further preferably in a rate of from 20 to 200 parts by weight, with respect to 100 parts by weight of the acrylic polymer fine particles. As for the ultraviolet absorber, it is possible to employ benzotriazole-based ultraviolet absorbers, and the like. Note that the ultraviolet absorber can preferably be compounded in the present acrylic sol in a rate of from 0.5 to 10 parts by weight with respect to 100 parts by weight of the acrylic polymer fine particles.

Preparation Method of the Present Acrylic Sol

The preparation method of the present acrylic sol is not limited in particular, it is possible to employ the methods, which have been used commonly for preparing acrylic sols. For example, it is possible to prepare the present acrylic sol by fully mixing and stirring the above-described acrylic polymer fine particles, plasticizer, filler, blocking type urethane resin, curing agent, foaming agent and optionally the other additives with a known mixer. As for the mixer, it is possible to employ a planetary mill, a kneader, a grain mill, a roller mill, etc.

Coating Method of the Present Acrylic Sol

It is possible to coat the present acrylic sol by a conventionally known method, such as the brush coating, the roller coating, the air-spray coating, the airless-spray coating, etc. However, in order to obtain an aiming paint film thickness on a coating line side of automobile manufacture, the airless-spray coating, which allows to obtain a thick film in a short period of time, can be most appropriate. Note that the airless-spray coating herein includes such an improved coating method as, the electrostatic airless-spray coating, air-assist airless-spray coating, etc. Moreover, when the present acrylic sol is coated on surfaces of steel plates, such as the wheel house, the exterior bottom side of the underbody, etc., in a coating line of an automobile manufacturing line, it is possible to carry out the coating by the aforementioned airless-spray coating, etc., onto the steel plates, which have been undergone the foregoing processes, such as a degreasing process, a chemical treatment process, an electrodeposition process, and so forth. The present acrylic sol is heated after it is coated, thereby forming a paint film. The heating method can also be carried out by following the ordinary methods. For example, it is possible to carry out heating by using a hot-air circulation drying furnace, and the like.

The present acrylic sol for a sound insulating underbody coating is hereinafter described concretely with reference to examples. The respective components set forth below were compounded in the rates summarized in Table 1 below, and were mixed and dispersed by a kneader. Thus, acrylic sols of the respective examples and comparative examples were obtained.

Acrylic Polymer Fine Particles: A core-shell structure acrylic polymer powder whose core portion was mainly composed of a copolymer of butyl methacrylate and isobutyl methacrylate and whose shell portion was mainly composed of a methyl methacrylate polymer;

Blocking Type Urethane Resin: A blocking type urethane resin which was made by reacting tolylene diisocyanate (TDI) with polypropylene glycol (PPG) so as to obtain a urethane resin and by blocking the resulting urethane resin with 3, 5-dimethyl pyrazole, serving as the amine-based blocking agent;

Curing Agent: Adipic acid dihydrazide;

Plasticizer: Diisononyl phthalate;

Foaming Agent: Azodicarbonamide;

Filler: Calcium carbonate; and

Diluent: A high melting point aliphatic solvent.

EXAMPLE NO. 1

90 parts by weight of the acrylic polymer fine particles, 10 parts by weight of the blocking type urethane resin, 0.8 parts by weight of the curing agent, 150 parts by weight of the plasticizer, 3 parts by weight of the foaming agent, 180 parts by weight of the filler, and 40 parts by weight of the diluent were compounded, thereby obtaining an acrylic sol of Example No. 1.

EXAMPLE NO. 2

Except that the compounding amount of the acrylic polymer fine particles was changed to 70 parts by weight, that the compounding amount of the blocking type urethane resin was changed to 30 parts by weight, that the compounding amount of the curing agent was changed to 1.6 parts by weight, and that the compounding amount of the diluent was changed to 35 parts by weight, an acrylic sol of Example No. 2 was prepared in the same manner as above-described Example No. 1.

EXAMPLE 3

Except that the compounding amount of the acrylic polymer fine particles was changed to 30 parts by weight, that the compounding amount of the blocking type urethane resin was changed to 70 parts by weight, that the compounding amount of the curing agent was changed to 3.7 parts by weight, and that the compounding amount of the diluent was changed to 30 parts by weight, an acrylic sol of Example No. 3 was prepared in the same manner as above-described Example No. 1.

EXAMPLE 4

Except that the compounding amount of the acrylic polymer fine particles was changed to 15 parts by weight, that the compounding amount of the blocking type urethane resin was changed to 85 parts by weight, that the compounding amount of the curing agent was changed to 4.5 parts by weight, and that the compounding amount of the diluent was changed to 25 parts by weight, an acrylic sol of Example No. 4 was prepared in the same manner as above-described Example No. 1.

EXAMPLE NO. 5

Except that the compounding amount of the acrylic polymer fine particles was changed to 95 parts by weight, that the compounding amount of the blocking type urethane resin was changed to 5 parts by weight, that the compounding amount of the curing agent was changed to 0.5 parts by weight, and that the compounding amount of the diluent was changed to 45 parts by weight, an acrylic sol of Example No. 5 was prepared in the same manner as above-described Example No. 1.

EXAMPLE NO. 6

Except that the compounding amount of the acrylic polymer fine particles was changed to 10 parts by weight, that the compounding amount of the blocking type urethane resin was changed to 90 parts by weight, that the compounding amount of the curing agent was changed to 4.8 parts by weight, and that the compounding amount of the diluent was changed to 25 parts by weight, an acrylic sol of Example No. 6 was prepared in the same manner as above-described Example No. 1.

TABLE 1

| | Compounding Amount (Parts by Weight) | | | | | |
|---|---|---|---|---|---|---|
| | Ex. #1 | Ex. #2 | Ex. #3 | Ex. #4 | Ex. #5 | Ex. #6 |
| A.P.F.P *[1] | 90 | 70 | 30 | 15 | 95 | 10 |
| B.T.U.R. *[2] | 10 | 30 | 70 | 85 | 5 | 90 |
| Curing Agent | 0.8 | 1.6 | 3.7 | 4.5 | 0.5 | 4.8 |
| Plasticizer | 150 | 150 | 150 | 150 | 150 | 150 |
| Foaming Agent | 3 | 3 | 3 | 3 | 3 | 3 |
| Filler | 180 | 180 | 180 | 180 | 180 | 180 |
| Diluent | 40 | 35 | 30 | 25 | 45 | 25 |

Note:
*[1] stands for Acrylic Polymer Fine Particles.
*[2] stands for Blocking Type Urethane Resin.

Evaluation Methods and Results

The acrylic sols of Example Nos. 1 through 6 were examined for the viscosity stability, the spraying property, the adhesion property, the chipping resistance, the cold resistance and the sound insulating property, respectively, by the following methods. The results are set forth in Table 2 below.

(1) Viscosity Stability

The initial viscosity of the respective acrylic sols was measured at a temperature of 20° C. by using a type "B" rotary viscometer. Thereafter, the respective acrylic sols were put into a sealed container, were held at a temperature of 35° C. for 10 days, and were thereafter cooled to 20° C. Then, the final viscosity of the respective acrylic sols was likewise measured. The viscosity stability was evaluated by the variation ratio from the initial viscosity to the final viscosity. In Table 2, the symbol, "○", indicates so good that the viscosity variation ratio was less than 50%, and the symbol, "X", indicates so poor that the viscosity variation ratio was 50% or more.

(2) Spraying Property

The spraying property was evaluated whether a favorable pattern width could be obtained or not when the respective acrylic sols were sprayed by using a king type airless pump, which was made by Japan Gray Co., Ltd. and which was equipped with a nozzle chip #643, at a pressure of 9 MPa. In Table 2, the symbol, "○", indicates so good that the favorable pattern width could be obtained, and the symbol, "X", indicates so poor that the pattern width could not be widened.

(3) Adhesion Property

The respective acrylic sols were coated on the ends of two steel plates, which had been coated by electrodeposition and which had a size of 100×25×1.0 mm. A spacer was held between the steel plates and was pressed therebetween so that the thickness of the adhered portion was adjusted to 3 mm. Under the circumstances, a baking operation was carried out at 130° C. for 20 minutes. Thereafter, the spacer was removed. Then, the steel plates were pulled at a tensile speed of 50 mm/min in the shearing directions. Finally, the respective adhered portions were observed how they were ruptured. In Table 2, the symbol, "○", indicates so good that there occurred the aggregation rupture, and the symbol, "X", indicates so poor that there occurred the interfacial rupture.

(4) Chipping Resistance

The respective acrylic sols were coated on a steel plate, which had been coated by electrodeposition and which had a size of 70×150×0.8 mm, in a thickness of 1 mm in a wet state, and were baked thereon at 130° C. for 20 minutes. Thereafter, the respective steel plates were cooled to 20° C., and were fastened slantingly by an angle of 60 degrees. Then, from a height of 2 m above the respective steel plates, M4 (as per Japanese Industrial Standard) brass nuts were dropped through a pipe having a diameter of 2 cm. The nuts were weighed when they made holes, which reached to the base surface, in the respective paint films.

(5) Cold Resistance

The respective acrylic sols were coated in a thickness of 2 mm on a plate, from which the resulting paint films could be removed, and were baked at 130° C. for 20 minutes. Thereafter, the respective plates were punched out with a #2 dumbbell (as per Japanese Industrial Standard) die. Then, the resulting dumbbell-shaped paint films were pulled at −30° C. at a tensile speed of 50 mm/min. In Table 2, the symbol, "◯", indicates so good that the samples exhibited an elongation percentage of more than 50%, and the symbol, "X", so poor indicates that the samples exhibited an elongation percentage of 50% or less.

(6) Sound Insulating Property

The respective acrylic sols were spray-coated in a thickness of 2 mm in a wet state on a central portion of a steel plate, which was coated with an electrodeposition coating and which had a size of 300×300×1.6 mm, over an areal range of 190×190 mm with an airless pump. Thereafter, the respective acrylic sols were baked at 130° C. for 20 minutes, and were cooled to 20° C. to make coated plates for testing. The coated plates were fastened slantingly by an angle of 45 degrees with respect a vertical plane. Then, from a height of 2 m above the coated plates, steel balls having a diameter of 8 mm were dropped. The impact sounds, which were generated when the steel balls hit the respective coating films, were monitored to measure the magnitudes with a microphone, which was disposed at a position away from the center of the coated plates by 200 mm in the laterally horizontal direction. Note that the measurements of the impact sounds were carried out under the following conditions:

Measurement Conditions: "Ch" Single Mode (800 lines) and Frequency Range of 10 kHz;

Data Retrieving Conditions: Retrieving Data at Time Periods of 80 ms and Averaging 8 Retrieved Data; and Frequency Analysis: ⅓ Octave and "A" Characteristic Correction.

TABLE 2

|        | Ex. #1 | Ex. #2 | Ex. #3 | Ex. #4 | Ex. #5 | Ex. #6 |
|--------|--------|--------|--------|--------|--------|--------|
| V. S. *¹ | ◯ | ◯ | ◯ | ◯ | ◯ | ◯ |
| S.P. *² | ◯ | ◯ | ◯ | ◯ | ◯ | × |
| A.P. *³ | ◯ | ◯ | ◯ | ◯ | ◯ | ◯ |
| C.R. *⁴ | 40 | 55 | 110 | 125 | 25 | 140 |
| C.R. *⁵ | ◯ | ◯ | ◯ | ◯ | × | ◯ |
| S.I.P. *⁶ | 65 | 67 | 71 | 74 | 64 | 78 |
| O.P. *⁷ | ◯ | ◯ | ◯ | ◯ | × | × |

Note:
*¹stands for Viscosity Stability.
*²stands for Spraying Property.
*³stands for Adhesion Property.
*⁴stands for Chipping Resistance (Kg/wet 1 mm).
*⁵stands for Cold Resistance.
*⁶stands for Sound Insulating Property (dB/wet 2 mm).
*⁷stands for Overall Evaluation.

It is apparent from Table 2 that the acrylic sols of Example Nos. 1 through 4 did not exhibit a viscosity increment during the storage, and that they were favorable in terms of the spraying property. Moreover, in addition to the chipping resistance and the sound insulating performance, the acrylic sols of Example Nos. 1 through 4 were also favorable in terms of the adhesion property and the cold resistance. In the overall evaluation, the acrylic sols of Example Nos. 1 through 4 were fully applicable to a sound insulating underbody coating. Thus, the advantageous effects, which resulted from compounding the blocking type urethane resin and the foaming agent, were proved.

Further, it was verified that the acrylic sols of Example Nos. 1 through 4, whose weight ratio of the acrylic polymer fine particles to the blocking type urethane resin fell in the range of from 90/10 to 15/85, were improved in terms of the chipping resistance, the cold resistance and the spraying property, compared with the acrylic sols of Example Nos. 5 and 6, whose weight ratio of the acrylic polymer fine particles to the blocking type urethane resin fell outside the range. Namely, compared with the acrylic sol of Example No. 5 in which the blocking type urethane resin was included less so that the weight ratio of the acrylic polymer fine particles to the blocking type urethane resin was more than 90/10, the acrylic sols of Example Nos. 1 through 4 were improved in terms of the chipping resistance, the cold resistance and the sound insulating performance. While, compared with the acrylic sol of Example No. 6 in which the blocking type urethane resin was included more so that the weight ratio of the acrylic polymer fine particles to the blocking type urethane resin was less than 15/85, the acrylic sols of Example Nos. 1 through 4 were improved in terms of the spraying property.

Thus, it was verified that the compounding amount of the blocking type urethane resin could preferably fall in the range of from 90/10 to 85/10 by a weight ratio of the acrylic polymer fine particles to the blocking type urethane resin.

Furthermore, in the acrylic sols of Example Nos. 1 through 4, it was confirmed that, as far as the compounding amount of the blocking type urethane fell in the aforementioned range, the chipping resistance and the sound insulating property were furthermore improved in proportion to the increment of the compounding amount of the blocking type urethane resin.

Having now fully described the present invention, it will be apparent to one of ordinary skill in the art that many changed and modifications can be made thereto without departing from the spirit or scope of the present invention as set forth herein including the appended claims.

What is claimed is:

1. An acrylic sol for a sound insulating underbody coating, the acrylic sol comprising:
    acrylic polymer fine particles;
    a plasticizer;
    a filler;
    a blocking type urethane resin;
    a curing agent wherein said curing agent is selected from adipic acid dihydrazide and sebatic acid dihydrazide; and
    a foaming agent.

2. The acrylic sol according to claim 1, wherein a weight ratio of said acrylic polymer fine particles with respect to said blocking type urethane resin falls in a range of from 90/10 to 15/85.

3. The acrylic sol according to claim 1, wherein said blocking type urethane resin is blocked by at least one member selected from the group consisting of oxime blocking agents and amine blocking agents.

4. The acrylic sol according to claim 1, wherein said acrylic polymer fine particles are core-shell structure fine particles which are composed of a core portion and a shell portion.

5. The acrylic sol according to claim 4, wherein the core portion is a polymer, which is made from at least one methacrylate selected from the group consisting of n-butyl methacrylate, iso-butyl methacrylate and ethyl methacrylate, or a copolymer thereof; and the polymer or the copolymer is contained in the core portion in an amount of 50% by weight or more.

6. The acrylic sol according to claim 4, wherein the shell portion is a polymer, which is made from at least one member selected from the group consisting of methyl methacrylate, benzyl methacrylate, styrene, or a copolymer thereof; and the polymer or the copolymer is contained in the shell portion in an amount of 50% by weight or more.

7. The acrylic sol according to claim 4, wherein a ratio of the core portion with respect to the shell portion falls in a range of from 25/75 to 70/30 by weight.

8. The acrylic sol according to claim 1, wherein said acrylic polymer fine particles include a polymer or a copolymer, which is made from at least one monomer selected from the group consisting of alkyl acrylate ester and alkyl methacrylate ester.

9. The acrylic sol according to claim 1, wherein said acrylic polymer fine particles have an weight average molecular weight falling in a range of from 10,000 to 2,000,000.

10. The acrylic sol according to claim 1, wherein said acrylic polymer fine particles have an average particle diameter falling in a range of from 0.1 to 50 $\mu$m.

11. The acrylic sol according to claim 1, wherein said plasticizer includes at least one member selected from the group consisting of a phthalic acid-based plasticizer, a fatty ester-based plasticizer, a phosphoric ester-based plasticizer, an epoxy-based plasticizer, a polyester-based plasticizer and a benzoic acid-based plasticizer.

12. The acrylic sol according to claim 1, wherein said plasticizer is compounded in said acrylic sol in a rate of from 50 to 500 parts by weight with respect to 100 parts by weight of said acrylic polymer fine particles.

13. The acrylic sol according to claim 1, wherein said filler includes at least one member selected from the group consisting of calcium carbonate, mica, talc, kaoline clay, silica, barium sulfate and fiber-shaped fillers.

14. The acrylic sol according to claim 1, wherein said filler is compounded in said acrylic sol in a rate of from 50 to 800 parts by weight with respect to 100 parts by weight of said acrylic polymer fine particles.

15. The acrylic sol according to claim 1, wherein said blocking type urethane resin is made by reacting an $\alpha$-polyol with an isocyanate and by blocking the resulting urethane resin with a blocking agent.

16. The acrylic sol according to claim 1, wherein said blocking type urethane resin is compounded in said acrylic sol in a rate of from 10 to 600 parts by weight with respect to 100 parts by weight of said acrylic polymer fine particles.

17. The acrylic sol according to claim 1, wherein said curing agent is compounded in said acrylic sol in a rate of from 0.5 to 500 parts by weight with respect to 100 parts by weight of said blocking type urethane resin.

18. The acrylic sol according claim 1, wherein said foaming agent includes at least one member selected from the group consisting of an azo-based foaming agent, a nitroso-based foaming agent and a hydrazine-compound-based foaming agent.

19. The acrylic sol according to claim 1, wherein said foaming agent is compounded in said acrylic sol in a rate of from 0.5 to 30 parts by weight with respect to 100 parts by weight of said acrylic polymer fine particles.

20. A sound insulating underbody coating made from an acrylic sol, the acrylic sol comprising:
   acrylic polymer fine particles;
   a plasticizer;
   a filler;
   a blocking type urethane resin;
   a curing agent wherein said curing agent is selected from adipic acid dihydrazide and sebatic acid dihydrazide; and
   a foaming agent.

21. The sound insulating underbody coating according to claim 20, wherein a weight ratio of said acrylic polymer fine particles with respect to said blocking type urethane resin falls in a range of from 90/10 to 15/85 in said acrylic sol.

22. The sound insulating underbody coating according to claim 20, wherein said blocking type urethane resin is blocked by at least one member selected from the group consisting of oxime blocking agents and amine blocking agents.

23. The sound insulating underbody coating according to claim 20, wherein said acrylic polymer fine particles are core-shell structure fine particles which are composed of a core portion and a shell portion.

24. The sound insulating underbody coating according to claim 23, wherein the core portion is a polymer, which is made from at least one methacrylate selected from the group consisting of n-butyl methacrylate, iso-butyl methacrylate and ethyl methacrylate, or a copolymer thereof; and the polymer or the copolymer is contained in the core portion in an amount of 50% by weight or more.

25. The sound insulating underbody coating according to claim 23, wherein the shell portion is a polymer, which is made from at least one member selected from the group consisting of methyl methacrylate, benzyl methacrylate, styrene, or a copolymer thereof; and the polymer or the copolymer is contained in the shell portion in an amount of 50% by weight or more.

26. The sound insulating underbody coating according to claim 23, wherein a ratio of the core portion with respect to the shell portion falls in a range of from 25/75 to 70/30 by weight.

27. The sound insulating underbody coating according to claim 20, wherein said acrylic polymer fine particles include a polymer or a copolymer, which is made from at least one monomer selected from the group consisting of alkyl acrylate ester and alkyl methacrylate ester.

28. The sound insulating underbody coating according to claim 20, wherein said acrylic polymer fine particles have an weight average molecular weight falling in a range of from 10,000 to 2,000,000.

29. The sound insulating underbody coating according to claim 20, wherein said acrylic polymer fine particles have an average particle diameter falling in a range of from 0.1 to 50 $\mu$m.

30. The sound insulating underbody coating according to claim 20, wherein said plasticizer includes at least one member selected from the group consisting of a phthalic acid-based plasticizer, a fatty ester-based plasticizer, a phosphoric ester-based plasticizer, an epoxy-based plasticizer, a polyester-based plasticizer and a benzoic acid-based plasticizer.

31. The sound insulating underbody coating according to claim 20, wherein said plasticizer is compounded in said acrylic sol in a rate of from 50 to 500 parts by weight with respect to 100 parts by weight of said acrylic polymer fine particles.

32. The sound insulating underbody coating according to claim 20, wherein said filler includes at least one member selected from the group consisting of calcium carbonate, mica, talc, kaoline clay, silica, barium sulfate and fiber-shaped fillers.

33. The sound insulating underbody coating according to claim 20, wherein said filler is compounded in said acrylic sol in a rate of from 50 to 800 parts by weight with respect to 100 parts by weight of said acrylic polymer fine particles.

34. The sound insulating underbody coating according to claim 20, wherein said blocking type urethane resin is made by reacting an α-polyol with an isocyanate and by blocking the resulting urethane resin with a blocking agent.

35. The sound insulating underbody coating according to claim 20, wherein said blocking type urethane resin is compounded in said acrylic sol in a rate of from 10 to 600 parts by weight with respect to 100 parts by weight of said acrylic polymer fine particles.

36. The sound insulating underbody coating according to claim 20, wherein said curing agent is compounded in said acrylic sol in a rate of from 0.5 to 500 parts by weight with respect to 100 parts by weight of said blocking type urethane resin.

37. The sound insulating underbody coating according claim 20, wherein said foaming agent includes at least one member selected from the group consisting of an azo-based foaming agent, a nitroso-based foaming agent and a hydrazine-compound-based foaming agent.

38. The sound insulating underbody coating according to claim 20, wherein said foaming agent is compounded in said acrylic sol in a rate of from 0.5 to 30 parts by weight with respect to 100 parts by weight of said acrylic polymer fine particles.

39. An acrylic sol for a sound insulating underbody coating, the acrylic sol comprising:

acrylic polymer fine particles;

a plasticizer in a rate of from 50 to 500 parts by weight with respect to 100 parts by weight of the acrylic polymer fine particles;

a filler in a rate of from 50 to 800 parts by weight with respect to 100 parts by weight of the acrylic polymer fine particles;

a blocking type urethane resin in a rate of from 10 to 600 parts by weight with respect to 100 parts by weight of the acrylic polymer fine particles;

a curing agent selected from adipic acid dihydrazide and sebatic acid dihydrazide in a rate of from 0.5 to 500 parts by weight with respect to 100 parts by weight the blocking type urethane resin;

a foaming agent in a rate of from 0.5 to 30 parts by weight with respect to 100 parts by weight of the acrylic polymer fine particles; and a diluent in a rate of from 100 to 500 with respect to 100 parts by weight of the acrylic polymer fine particles.

40. A sound insulating underbody coating made from an acrylic sol, the acrylic sol comprising:

acrylic polymer fine particles;

a plasticizer in a rate of from 50 to 500 parts by weight with respect to 100 parts by weight of the acrylic polymer fine particles;

a filler in a rate of from 50 to 800 parts by weight with respect to 100 parts by weight of the acrylic polymer fine particles;

a blocking type urethane resin in a rate of from 10 to 600 parts by weight with respect to 100 parts by weight of the acrylic polymer fine particles;

a curing agent selected from adipic acid dihydrazide and sebatic acid dihydrazide in a rate of from 0.5 to 500 parts by weight with respect to 100 parts by weight the blocking type urethane resin;

a foaming agent in a rate of from 0.5 to 30 parts by weight with respect to 100 parts by weight of the acrylic polymer fine particles; and a diluent in a rate of from 10 to 500 with respect to 100 parts by weight of the acrylic polymer fine particles.

* * * * *